Aug. 22, 1933. O. BIHET 1,924,020
TIGHT JOINT FOR PIPINGS
Filed Jan. 2, 1932 2 Sheets-Sheet 1

INVENTOR
OSCAR BIHET
by his attorneys
Howson and Howson

Aug. 22, 1933.    O. BIHET    1,924,020
TIGHT JOINT FOR PIPINGS
Filed Jan. 2, 1932    2 Sheets-Sheet 2

INVENTOR
OSCAR BIHET
by his attorneys
Howson and Howson

Patented Aug. 22, 1933

1,924,020

UNITED STATES PATENT OFFICE 1,924,020

TIGHT JOINT FOR PIPINGS

Oscar Bihet, Flemalle Haute, Belgium

Application January 2, 1932, Serial No. 584,543
and in Belgium June 11, 1931

2 Claims. (Cl. 285—163)

My invention relates to a joint for pipes of underground or other pipings for gas, water, air or the like, and also for the connection of pipings, fittings and the like.

The object of the invention is to ensure the tightness of pipings assembled by sleeve joints or spigot and socket joints, both as regards internal and/or external pressure.

In drinking water pipe-lines namely, it is most important to prevent the penetration in the piping of noxious liquids which can at any time be present in the soil and would thus defile the water intended for drinking.

Another advantage of the joint according to this invention lies in the great simplicity and rapidity of assembling, which requires no training of the workmen and can be performed by any labourer.

This joint is based on the strong compression of a resilient material between the walls of a suitably dimensioned and shaped housing managed either in a coupling sleeve or in the interior of a reinforced end of the pipe, and the outside surface of one end of another pipe.

Owing to such strong compression, the resilient material completely fills all the interstices and opposes to any pressure either from inside or from outside.

Opposite to some known joints, the tightness of which is ensured by the internal pressure of the fluid, the joint according to this invention ensures the same tightness under low or high pressures, even in the case of pressures lower than atmospheric pressure in the interior of the piping.

Being held in a groove of suitable size, it is not deformable.

During the introduction of the spigot end of the pipe in the sleeve or socket, it does not twist and permits to introduce and/or withdraw the pipes as often as necessary. It can be used again when placing new pipes.

It allows the pipes to exand or contract with the changes of temperature.

The pipe can slide in the sleeve or socket without damaging the joint.

Figure 1:
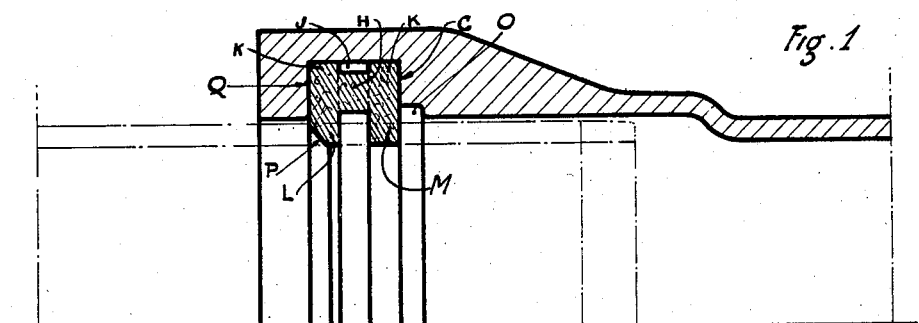
Figure 2:
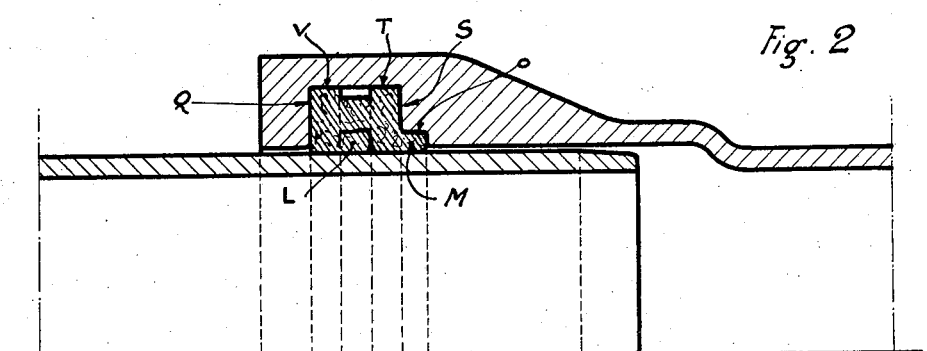
Figure 3:
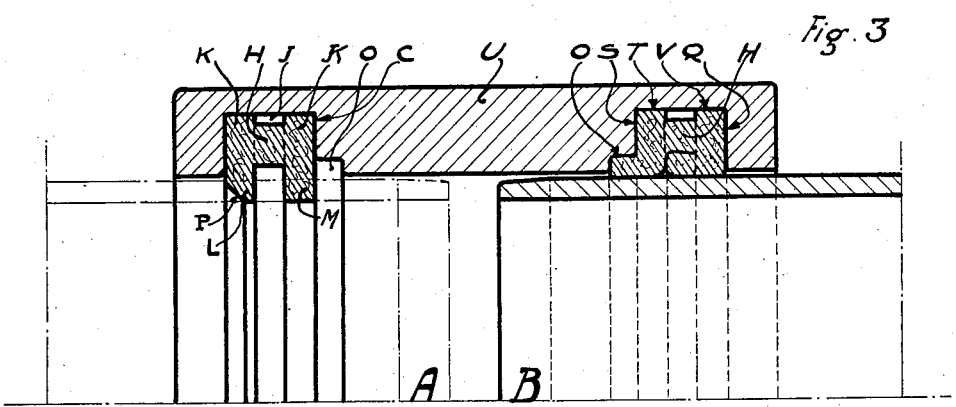
Figure 4:
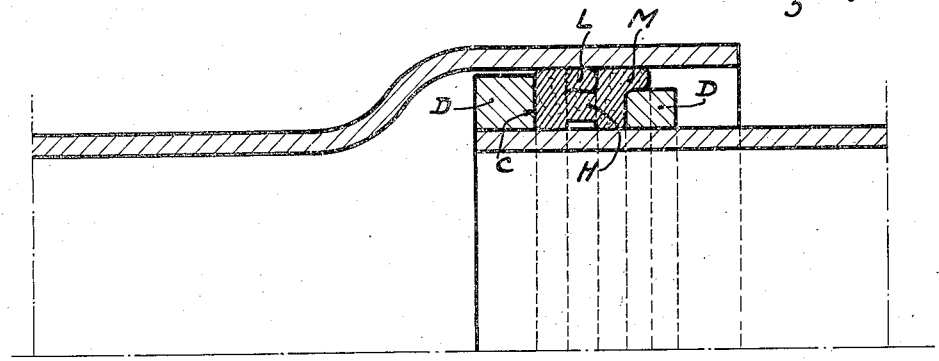
Figure 5:
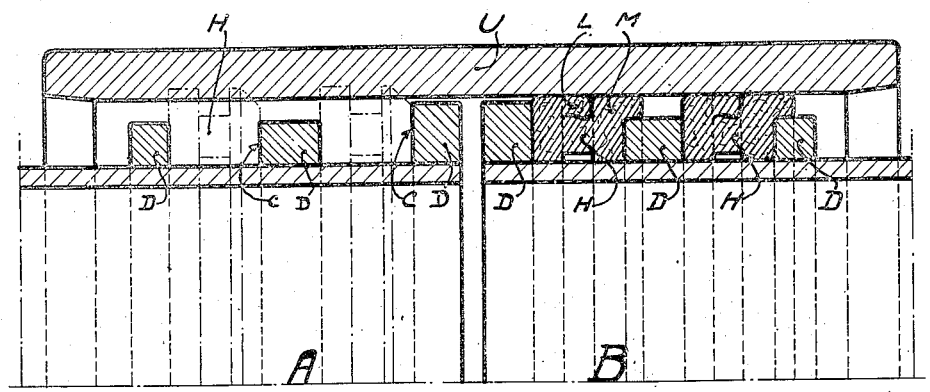

In the accompanying drawings, Fig. 1 illustrates a socket pipe in which the joint is placed in its housing previous to the introduction of the spigot pipe. Fig. 2 shows the same socket pipe with the joint pressed in by the spigot pipe. Fig. 3 illustrates the same two phases of the operation when using a connection sleeve. Fig. 4 illustrates a joint in working position in a spigot and socket assembly when it is not possible to cut grooves in the socket; Fig. 5 shows the joint as used with a sleeve connection in the same case.

Description

In one reinforced end of the pipe, Figs. 1 and 2, or at each end of a sleeve Fig. 3, is cut out a groove C, having the same size as the outside of the joint. The joint proper, made of a resilient material, such as rubber or the like, is of H shaped section. In the illustration of the cross section of the joint, the horizontal bar of the H is parallel with the axis of the assembled pipes.

The groove J has been so designed as to produce two lips K which, by their resiliency, will assume the shape of the groove C and adhere perfectly to its walls.

The lips L and M are of such a length that they can be compressed between the inside walls of the sleeve or socket of one pipe and the exterior surface of another pipe (generally known as spigot pipe or male pipe). A bevel P is cut out of the lip L in order to facilitate the insertion of the spigot pipe and avoid the tearing of the joint off the wall Q of the groove.

The joint is shown in its working position in Figs. 2 and 3.

When fitting the pipes, the spigot or male end first presses on the joint in F (Figs. 1 and 3) and forces the lip L upwards, to be compressed between the pipe and the body of the joint.

In its forward motion the pipe lifts up the lip M, which fills the hollow space O, and becomes compressed between the walls of said hollow and the external surface of the spigot pipe.

The Figs. 2 and 3 clearly illustrate the position in working order. The joint being compressed in every direction, adheres to the walls Q, S, T, V and to the external surface of the spigot end.

In sleeve connected pipings, two joints are arranged in grooves C managed in the sleeve. The part A, on the left hand of Figure 3, illustrates the joint before the introduction of the pipe in the sleeve. The part B, on the right hand, illustrates the working of the joint. The principle is the same as for spigot and socket joints.

Uses of this type of joint

The joint H can be used for pipes and tubes of every description.

Cast pipes are generally made with a reinforced end, the inside diameter of which allows the introduction of the spigot end.

The type of joint illustrated in Figs. 1 and 2 should be used in this case.

Steel pipes are generally produced by rolling, and have also a reinforced end. This end is used for the location of the joint H as shown in Figs. 1 and 2. It is then sufficient to expand the reinforced end in order to form a socket, and to manage in same the groove C.

Pipes made of any other material can also be provided in some cases, with a reinforced end which permits the location of the joint illustrated in Figs. 1 and 2.

When the pipes or tubes have straight ends, i. e. when their ends are of the same diameter and thickness as their body and do not allow the milling of a groove C, the type with union sleeve, illustrated in Fig. 3, can be used.

In cases when, for any reason, it is not possible to mill grooves in the socket or sleeve, the arrangement illustrated in Figs. 4 or 5 can be resorted to. In such cases, the joint is inserted in an inverted position as compared to the one shown in Figs. 1, 2 and 3.

The spigot end of the pipe is then provided with rings D, fastened in any suitable manner, thus producing grooves C in which the resilient joints H shall be placed.

With steel pipes, said rings can be welded or fastened in any other suitable way.

With cast iron or other cast pipes, the rings may be cast with the pipes or fastened in any suitable way.

This arrangement, when duplicated, i. e. with two joints at every end of the pipe, is of great efficiency for meeting large expansion, as it enables of maintaining the required alinement and preventing the wedging of the pipes in the sleeve U. This is illustrated in Fig. 5.

The left hand part A of this Figure illustrates the joints before their insertion in the sleeve, and the left hand part, B, illustrates the joints in their working position.

When employed as shown in Figs. 4 and 5 the joint H ensures complete tightness in the same manner as in the cases illustrated in Figs. 1, 2, and 3, owing to the lips L and M being bent and strongly compressed between the inside walls of the socket or sleeve and the inside surface of the rings.

I claim:

1. In a pipe conduit in which the end of one pipe member enters the end of another pipe member, a coupling for making a tight joint between the outer surface of the inner member and the inner surface of the outer member, comprising an annular ring of H section received in an annular groove in one of said surfaces, the flanges which project out of the groove being spaced apart a distance determined by the length of the first flange whereby said first flange fills the space therebetween, and said first flange being of sufficient width to cause compression of both said first flange and the resilient material onto which it is bent.

2. A tight joint for conduits of pipes, comprising a ring of resilient material having a section in the form of a letter H placed perpendicularly to the axis of the pipes to be assembled, and lodged in a groove formed in one of the mating surfaces of said pipes, whereby upon the introduction of the inner pipe end into the outer pipe end, the first flange extending from said ring bends to lie compressed between the second, the bridge of the H section and the other mating surface, and the second flange extending from said ring bends to lie compressed between said other mating surface and the wall of said groove, thereby rendering the joint tight against internal or external pressures of various degrees by not only the bending but also the compression of said flanges between the mating surfaces of said pipes.

OSCAR BIHET.